United States Patent [19]

Shibata et al.

[11] Patent Number: 4,497,004
[45] Date of Patent: Jan. 29, 1985

[54] PICTURE REPRODUCING APPARATUS IN A HELICAL SCANNING VIDEO TAPE RECORDER

[75] Inventors: Akira Shibata; Makoto Konosu; Teizo Tamura; Koichi Hirose, all of Katsuta; Kuniaki Miura, Ibaraki; Noboru Kojima; Keiichi Komatsu, both of Yokohama, all of Japan

[73] Assignee: Hitachi, Ltd., Tokyo, Japan

[21] Appl. No.: 384,742

[22] Filed: Jun. 2, 1982

[30] Foreign Application Priority Data

Jun. 10, 1981 [JP] Japan .............................. 56-88133
Mar. 29, 1982 [JP] Japan .............................. 57-49073

[51] Int. Cl.³ ............................................. G11B 5/52
[52] U.S. Cl. ................................... 360/108; 330/190; 336/123
[58] Field of Search ............. 360/64, 84, 85, 107–108, 360/61, 130.22, 130.23, 130.24, 70; 336/120, 336/123; 330/188, 195, 197, 190

[56] References Cited

U.S. PATENT DOCUMENTS

| 4,096,535 | 6/1978 | Highnote | 360/108 X |
| 4,139,871 | 2/1979 | Yoshida | 360/108 X |
| 4,212,042 | 7/1980 | Kosheler | 360/64 X |

FOREIGN PATENT DOCUMENTS 52-41504  3/1977  Japan ................................. 360/108

Primary Examiner—A. J. Heinz
Attorney, Agent, or Firm—Antonelli, Terry & Wands

[57] ABSTRACT

A picture reproducing apparatus for a helical scanning video tape recorder including an impedance transformer; a video head connected to the input of the impedance transformer; a resonance circuit connected to the output of the impedance transformer; a pre-amplifier connected to the output of the resonance circuit; a feedback resistor connected between the junction of the pre-amplifier and resonance circuit and the output of the pre-amplifier; and an output terminal connected to the output of the pre-amplifier. The impedance transformer has the output impedance four times as high as the input impedance thereof.

6 Claims, 13 Drawing Figures

PICTURE REPRODUCING APPARATUS IN A HELICAL SCANNING VIDEO TAPE RECORDER

BACKGROUND OF THE INVENTION

The present invention relates to a magnetic recording and reproducing apparatus using video heads with less turns of the winding.

One example of magnetic recording and reproducing apparatus is a household video tape recorder (VTR). The winding of the video head used in such VTRs needs 15 turns to 20 turns, and such large number of turns adversely affects the productivity of video heads. FIG. 1 shows an example of the structure of the video head. As can be seen from the figure, the winding of a video head 1 is arranged by threading a copper wire 2 for 20 times through an aperture 3, which is similar to the hole of a pin, provided in the head. This fabricating phase is not only a time-consuming work, but also a cumbersome job for workers. The following will describe the reason why the video head in the conventional VTR employs a winding of 20 turns.

FIG. 2 is a block diagram showing briefly the circuit arrangement of the conventional 2-head helical scanning VTR.

The recording operation will first be described. The video signal received at the input terminal 12 is fed through the recording circuit 10 and converted into the recording signal. The recording signal is amplified by the writing amplifier 7, which then provides the recording current in the video heads 1a and 1b. Each of the video heads 1 has a winding whose inductance is chosen to be around 2 $\mu$H in 20 turns. The rotary transformers 5a and 5b have a turn ratio (the ratio of the number of turns of the secondary winding to the number of turns of the primary winding) of 1:2. The primary windings (head side) of 5a and 5b have four turns and three turns, respectively, and the secondary windings (head amplifier side) of 5a and 5b have eight turns and six turns, respectively.

In the above conditions, the writing amplifier 7 is required to produce an output signal voltage (peak to peak) of 3-4 V P-P for providing the recording current for the oxide film tape. The magnitude of 3-4 V P-P is appropriate for the power voltage of 9-12 V for the writing amplifier 7. If the head has a lower impedance seen from the writing amplifier than that mentioned above by provision of less number of turns for the heads 1a and 1b or different turn ratio for the rotary transformers 5a and 5b, the recording current will increase, resulting disadvantageously in an increased power dissipation. On the other hand, if the head has a higher impedance, a higher output signal voltage will be required for the writing amplifier, causing a distortion in the signal waveform.

Next, the picture reproducing operation will be described. The signals produced by the video heads 1a and 1b are conducted through the rotary step-up transformers 5a and 5b, then fed to the head amplifiers 8a and 8b. Capacitors 9a and 9b are provided to have a resonant relationship with the inductances of the heads seen from the head amplifiers 8a and 8b, respectively, with each resonant frequency being chosen in the neighborhood of the maximum carrier frequency of the reproduced FM signal. Such resonant frequency is effective for suppressing impedance noises and also for noise matching between the head amplifiers 8a and 8b and the video heads 1a and 1b.

Accordingly, if the signal source impedance is lowered by reducing the turns of the head or by changing the turn ratio of the rotary transformer, the above-mentioned resonant characteristics may be retained, but the noise matching between the heads 1a and 1b and respective amplifiers 8a and 8b will be deteriorated. Conversely, a higher signal source impedance makes noise matching easy, however, the resonant characteristics will be lost. The resonant frequency is determined by the inductance of the head and the total capacitance of the stray capacitance, input capacitance of the amplifier and capacitors 9a and 9b. Therefore, if the inductance of the head is too large, the required high resonant frequency cannot be obtained even with the smallest value for the capacitors 9a and 9b.

The following will explain the reason why the rotary transformers 5a and 5b have different number of turns. FIGS. 3A and 3B are the plan view and cross-sectional view of the rotary transformers 5 shown in FIG. 2. The rotary transformer used in household VTRs has the structure as shown in FIGS. 3A and 3B, where a rotor core 14 and a stator core 15 confront each other with windings 16 and 18 for the first channel and windings 17 and 19 for the second channel being disposed concentrically.

The question here is the different diameters of the winding 16 for the first channel and the winding 17 for the second channel. If the windings 16 and 17 have the same number of turns, the inductance of the primary winding for the second channel having a larger diameter will be larger than that for the first channel, causing the unevenness among the channels. The difference of diameter is compensated by providing different number of turns for each channel, such as, for example, four turns for the first channel winding 16 and three turns for the second channel winding. Variable resistors 14a and 14b are provided for adjusting the boosting value at the resonant frequency, however, they cause a deterioration of the S/N ratio.

In FIG. 2, the output signals from the amplifiers 8a and 8b are fed to the reproduction signal processing circuit 11, where the signals are demodulated into the video signal, and the reproduced video signal is obtained at the output terminal 13.

Next, the relationship between the inductance of the primary winding of the rotary transformer 5 and the inductance of the video head will be described. If the rotary transformer 5 is an ideal transformer with a coupling coefficient of one, it is not necessary to provide a specific relationship between the inductance of the rotary transformer and that of the head. However, the rotary transformer 5 has an air gap 20 as shown in FIG. 3B, causing the coupling coefficient (K) to fall to a value around 0.95. The matching condition for the inductance (Lh) of the video heads 1a and 1b and the primary winding inductance ($L_{RF}$) of the rotary transformer with the coupling coefficient (K) being unequal to one is expressed as follows.

$$L_{RF} = \frac{Lh}{\sqrt{1 - K^2}} \quad (1)$$

The above condition makes the value of $e_o/\sqrt{L_o}$ maximum for picture reproduction, where $L_o$ is the inductance of the head seen from the secondary winding of the rotary transformer 5 and $e_0$ is the no-load output. Accordingly, the value of $e_o/\sqrt{L_o}$ indicates the figure of merit for the frequency band of the reproduced FM signal (3-5 MHz in the case of VHS system). On the other hand, the condition that $L_{RF}$ becomes larger than $Lh/\sqrt{1-K^2}$ will result from an increased value of Lo with $e_o$ being constant, causing disadvantageously the resonant frequency to fall and the impedance noise to slise. Accordingly, the condition that $L_{RF}$ is larger than $Lh/\sqrt{1-K^2}$ to the extent where the resonant frequency is obtained is also acceptable for a system where the noise caused by the tape is larger than the impedance noise.

As regards the reading out of the chroma signal which is multiplexed in the frequency band below the FM signal band, the signal source impedance for this frequency band is very small and can be neglected. Accordingly, the figure of merit for the chroma signal is $e_o$, and the matching condition becomes simply $L_{RF} >> Lh$.

Consequently, the values of $L_{RF}$ and Lh for the existing household VTRs should preferably be chosen in accordance with the following equation.

$$L_{RF} = \gamma \frac{Lh}{\sqrt{1-K^2}} \quad (2)$$

where $\gamma$ ranges from 1.0 to 1.5.

If the value of $\gamma$ is too large, the resonant frequency determined from the inductance Lo, the stray capacitance, the capacitors 9a and 9b, and the input capacitance of the amplifiers 8a and 8b will become too low to obtain the reproduction FM equalizing characteristics. Accordingly, the value of $\gamma$ should be chosen so that the above-mentioned resonant frequency becomes higher than the reproduced FM carrier frequency.

In the conventional VTRs, however, there has been made no efforts to reduce the turns of the head, and neither having been paid attention for choosing a small $L_{RF}$, a large K and a large $\gamma$.

Under the foregoing situation, the conventional VTRs employ video heads having windings of 20 turns ($Lh=2$ μH), rotary transformers having primary windings for the first and second channels of 3 turns and 4 turns, respectively, ($L_{RF}=10-12$ μH, $K=0.97$) with a turn ratio of 1:2, and head amplifiers providing a recording signal voltage of 3-4 V P-P with a noise matching impedance of 200 Ω to 1 kΩ.

The prior art deficiencies are summerized as follows. (1) The rotary transformer has an inner winding of four turns and an outer winding of three turns. (2) In order for the video head to match the rotary transformer, the video head needs to have a winding of 20 turns. (3) The rotary transformer has a turn ratio of 1:2 so that the recording signal level is not too high and the noise figure of the head amplifier is not deteriorated under the above-mentioned conditions.

SUMMARY OF THE INVENTION

It is an object of the present invention to solve the foregoing prior art deficiencies and provide a helical scanning VTR which performs perfectly even by use of video heads having less number of turns.

According to one aspect of the present invention, there is provided a picture reproducing apparatus for a helical scanning video tape recorder having an impedance transformer, a video head connected to the input of the impedance transformer, a resonance circuit connected to the output of the impedance transformer, and a pre-amplifier connected to the output of the resonance circuit, characterized in that the impedance transformer has the output impedance four times as high as the input impedance thereof, and a feedback resistor is provided between the output of the pre-amplifier and the junction of the resonance circuit and the input of the pre-amplifier.

According to the present invention, the turns of the video head are reduced by making the turn ratio of the rotary transformer larger than 1:2. The fall in the resonant frequency and the deterioration of noise matching which are caused by the reduced turns of the head are compensated by the negative feedback damping instead of using the conventional trimmer capacitors for adjusting the resonant frequency and variable resistors for adjusting the boosting rate.

DESCRIPTION OF THE PREFERRED EMBODIMENTS

The invention will now be described in detail with reference to the accompanying drawings. In the rotary transformer shown in FIG. 3, if the winding 16 for the first channel and the winding 17 for the second channel have the same number of turns, the inductance of the primary winding for the second channel having a larger diameter will be larger than that for the first channel having a smaller diameter, causing disadvantageously the unevenness in the inductance of the primary windings of each channel. It has been practiced to solve the unevenness by providing different number of turns for the windings of the first and second channels. According to the present invention, the uneven inductances of the primary windings of each channel are substantially solved by providing different circuit parameters for each amplifier. If the rotary transformers for the first and second channels have the same turn ratio, the inductance of the second channel winding becomes larger than that of the first channel winding. Accordingly, the inductance of the second channel video head seen from the head amplifier also becomes larger than that of the first channel, resulting in a different resonant frequency for each channel depending on the values of the capacitors 9a and 9b. Accordingly, the problem can be solved by providing a smaller capacitor for the second channel than the capacitor for the first channel.

Another method for solving the problem is achieved by the proper design for the core of the rotary transformer. FIG. 4 is a magnified view of the part of the rotary transformer enclosed by the dashed line in FIG. 3B, showing the improved structure of the rotary transformer.

Figure 3A:
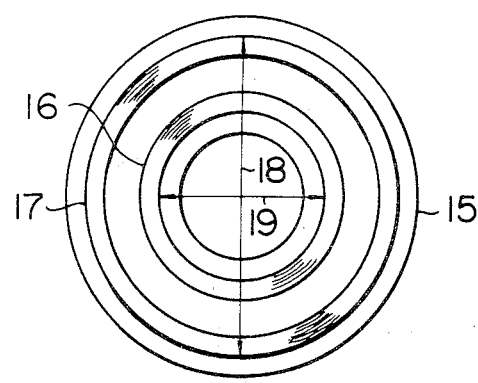
FIGS. 3A and 3B are a plan view and cross-sectional view showing, as an example, the structure of the rotary transformer.
Figure 3B:
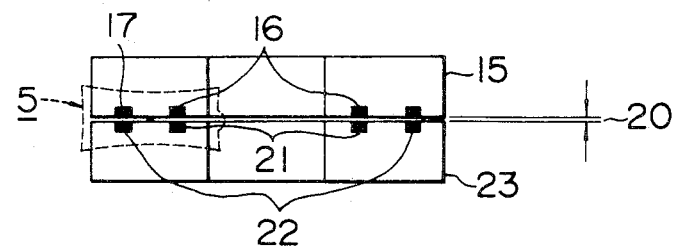
Figure 4:
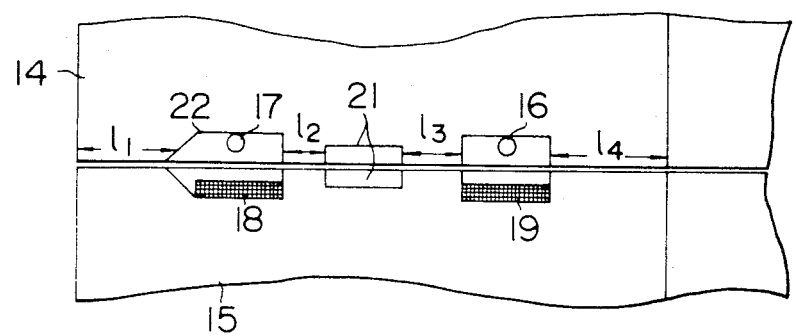
FIGS. 4 and 5 are cross-sectional views each showing, as an example, the principal portions of the rotary transformer having a 1-turn primary winding used in the present invention.

In FIG. 4, the winding slot 22 for the second channel is widened so as to shorten the length l1 as compared with that of FIG. 3B, and another slot 21 is provided between the slots for the first and second channels with the length l2 being smaller than l3. Thus, the magnetic resistance for the flux created by the winding 17 is made larger than that for the winding 16, thereby balancing the inductances of the windings for the first and second channels. The rotary transformer 5 shown in FIG. 4 has 1-turn primary windings for the first and second channels.

Next, an embodiment of the picture reproducing apparatus for a helical scanning VTR will be described in detail with reference to the drawings. There are two types of rotary transformer 5 for VTRs as shown in FIGS. 3A and 3B, one having a diameter of around 45 mm with the maximum diameter 18 of the winding being around 18 mm, and the other having a diameter of around 30 mm with the minimum diameter of the winding being around 15 mm. As the first example, the conventional VTR reproducing apparatus using the first-mentioned rotary transformer will be described. In this case, the value of $L_{RF}$ is about 10 $\mu$H in both 2-turn windings for the first and second channels as derived from equation (2) where K equals approximately 0.97. For the 2-turn primary windings of the rotary transformers for the first and second channels, if $\gamma$ is chosen to be 1, the Lh will be 24 $\mu$H and the number of turns of the head will be 22. Alternatively, if $\gamma$ is chosen to be 1.5, the Lh will be 1.6 $\mu$H and the number of turns of the head will be 18. In the conventional apparatus, the head winding has 20 turns with the value of Lh being 20 $\mu$H.

Accordingly, in order to reduce the number of turns of the conventional head winding, a larger $\gamma$ should be chosen or, alternatively, the 1-turn primary winding should be chosen for the rotary transformer so as to make the $L_{RF}$ small.

Figure 7:
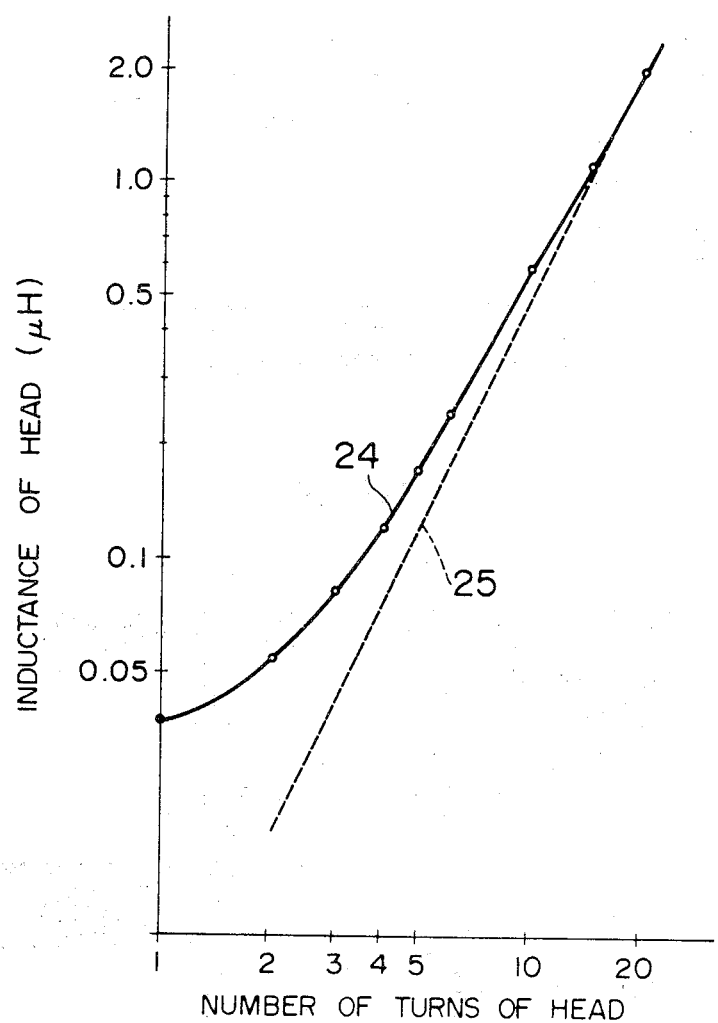
FIG. 7 is a graphical representation showing the relationship between the number of turns of the head and the inductance of the head.

The latter case will first be described. In this case, the $L_{RF}$ is approximately 2.5 $\mu$H, and with the values of $\gamma$ and K being $\gamma=1.0-1.5$ and $K=0.97$, the inductance of the head Lh should be chosen in the range from 0.4 to 0.6 $\mu$H. From the plot of FIG. 7 showing the relationship between the number of turns of the head and the inductance of the head, if Lh is assumed to be 0.4–0.6 $\mu$H, the number of turns $n_H$ of the head will be 8–10 turns. Thus, the possible number of turns for the head winding is 8, 9 or 10. These three cases of the head used in the VTR reproducing apparatus embodying the present invention will be described in connection with FIGS. 9 and 10.

Figure 1:
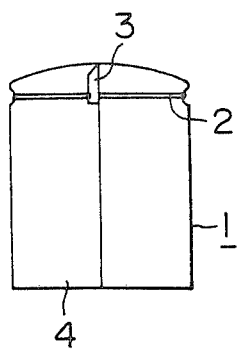
FIG. 1 is a plan view showing, as an example, the structure of the video head.
Figure 2:
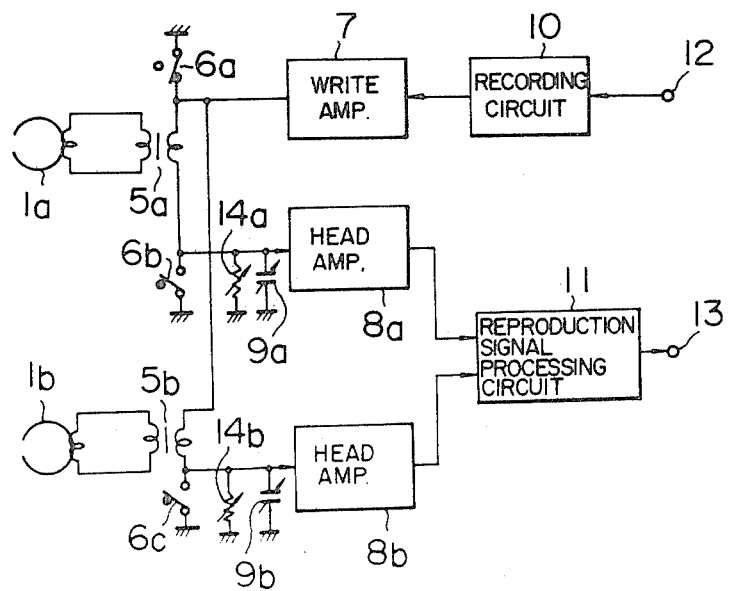
FIG. 2 is a block diagram showing the principal portions of the recording and reproducing system in the conventional 2-head helical scanning VTR.
Figure 9:
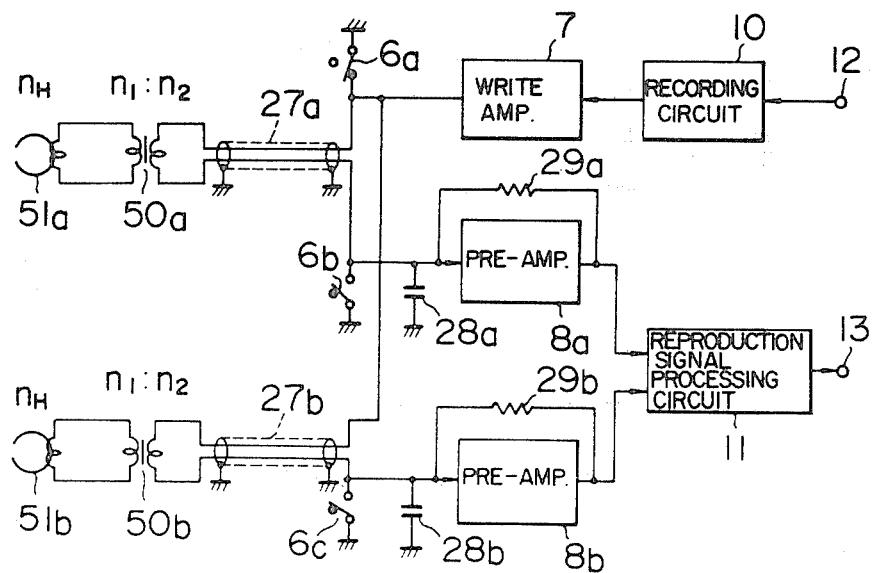
FIG. 9 is a block diagram showing, as an example, the principal portions of the recording and reproducing system in the 2-head helical scanning VTR according to the present invention.
Figure 10:
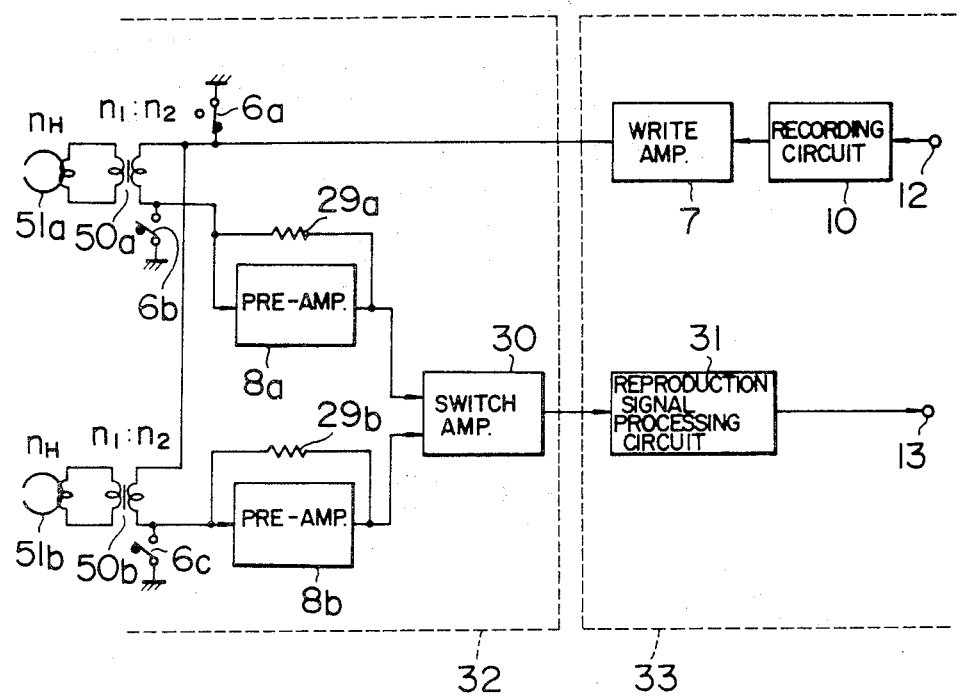
FIG. 10 is a block diagram showing another example of the principal portions of the recording and reproducing system in the 2-head helical scanning VTR according to the present invention.

In the embodiments of FIGS. 9 and 10, the same reference numbers as shown in FIG. 2 are used for the common portions. In FIGS. 9 and 10, reference numbers 50a and 50b denote rotary transformers and 51a and 51b denote video heads for the first and second channels, respectively.

With an assumption being made as $n_H = 10$ turns and $n1 = 1$ turns, the possible number of turns for n2 will be 4. The reason is that the inductance of the secondary winding of the rotary transformer seen from the pre-amplifier must be equal or slightly larger than that of the conventional rotary transformer (2 $\mu$H×4=8 $\mu$H) in order to obtain the desired resonant frequency. For the windings of $n_H = 10$ turns, $n1 = 1$ and $n2 = 4$, the inductance of the rotary transformer seen from the pre-amplifier is: $0.58 \mu H \times (4/1)^2 = 9.3 \mu H$. This value is slightly larger than the value of the conventional rotary transformer, and it will be difficult to obtain the proper resonant frequency. The present invention solves this problem by removing the trimmer capacitors for the adjustment of the resonant frequency. The trimmer capacitors (9a and 9b in FIG. 2) used in the conventional apparatus vary the capacitance in the range from 20 pF to 70 pF to cover the adjusting range of the resonant frequency. Consequently, the above-mentioned increase in the inductance can be cancelled substantially by the removal of the trimmer capacitors, and the same resonant frequency and noise matching as those of the conventional apparatus can be obtained.

The resonant capacitance in the above-mentioned arrangement consists of the capacitance of the shielded wire (20 pF), a capacitor (18 pF) and other capacitance including the pre-amplifier input capacitance (70 pF), and a resonant frequency of approximately 5 MHz is obtained. Accordingly, the removal of the capacitors 28a and 28b will result in a further increase in the resonant frequency by 10%.

For the winding of $n_H = 10$ turns, $n1 = 1$ and $n2 = 5$, the inductance of the rotary transformer seen from the pre-amplifier is: $0.58 \times (5/1)^2 = 14.5 \mu H$, and the resonant capacitance must be around 80 pF to obtain the resonant frequency of 5 MHz. The resonant capacitance of 80 pF can be achieved in the arrangement of FIG. 9 by removing the capacitors 28a and 28b and making the input capacitance (including the stray capacitance) of the pre-amplifier less than 60 pF. The existing pre-amplifier is supplied with 9 V for the power voltage Vcc. If the power voltage is lowered to 6 V or less, isoplanar transistors can be used for the pre-amplifier, and in this case the input capacitance can be lowered below 60 pF.

The circuit arrangement shown in FIG. 10 is suitable for attaining the resonant capacitance of 80 pF. A characteristic of the arrangement shown in FIG. 10 is the direct connection between the rotary transformers 50a and 50b and the respective pre-amplifiers 8a and 8b, eliminating the need for the shielded wire. The absence of the capacitance caused by the shielded wire allows the use of the conventional pre-amplifier to obtain the resonant frequency of 5 MHz.

In FIG. 10, reference number 32 denotes a printed wiring board provided on the cylinder mounted on the video head 51, and reference number 33 shows another board. The arrangement of FIG. 10 further includes an amplifier 30 for switching the outputs of the pre-amplifiers 8a and 8b, and a reproduction signal processing circuit 31.

Next, the arrangement with $\gamma = 1.2$ and $n_H = 9$ turn will be described. In this case, Lh becomes 0.94 $\mu$H, and for the windings of $n1 = 1$ and $n2 = 5$, the inductance of the rotary transformer seen from the pre-amplifier is 12.3 $\mu$H + $\alpha$, and for the windings of $n1 = 1$ and $n2 = 6$, the inductance is 17.6 $\mu$H + $\alpha$ (where $\alpha$ is the increased inductance caused by the increase in $\gamma$), and the resonant frequency of 5 MHz can be obtained by choosing the resonant capacitance of 74 pF and 52 pF, respectively. These conditions can be met by the arrangements shown in FIGS. 9 and 10 as in the case of the windings of $n_H = 10$ turns.

With $\gamma = 1.4$ and $n_H = 8$ turns, Lh becomes 0.4 $\mu$H, and for the windings of $n1 = 1$ and $n2 = 5$ the inductance of the rotary transformer seen from the pre-amplifiers becomes $(10+\beta)$ $\mu$H, for the windings of $n1 = 1$ and $n2 = 6$, the inductance becomes $(14.4+\beta)$ $\mu$H, and for the windings of $n1 = 1$ and $n2 = 7$ the inductance becomes $(19.6+\beta)$ $\mu$H (where $\beta$ is the inductance caused by the further increase in $\gamma$, and it takes the value of around 1.5 $\mu$H for $\gamma = 1.5$), and the resonant frequency of 5 MHz can be obtained by choosing the resonant capacitance of 84 pF, 61 pF and 47 pF, respectively.

Next, the compensation against the deterioration of the figure of merit shown in FIG. 8, which is another problem added to the falling resonant frequency, will be described. As can be seen from FIG. 8, the figure of merit of the head deteriorates as the number of turns of the head decreases. The value of $e_o/\sqrt{Lh}$ indicates the ratio of the head output ($e_o$) to the impedance noise ($\sqrt{Lh}$), and consideration must be taken in system design so that the equipment noise (impedance noise plus amplifier noise) is small enough relative to the tape noise. In general, a system is designed so that the equipment noise falls more than $-6$ dB below the tape noise. In the conventional system design for the arrangement of FIG. 2, this condition is met by provision of the head winding of 20 turns. According to the present invention, the equipment noise is alleviated by about 2–3 dB by employment of the feedback damping. For this purpose, the feedback resistors 29a and 29b are provided between the input and output of the pre-amplifiers 8a and 8b. Therefore, for the head which is used in combination with a pre-amplifier using the feedback damping, no problem will arise even if the figure of merit ($e_o/\sqrt{Lh}$) of the head deteriorates by 2–3 dB. Assuming that the figure of merit being allowed to deteriorate by 2 dB, the number of turns of the head can be reduced down to 4 turns. If the figure of merit is allowed to deteriorate by 3 dB, the number of turns of the head can be reduced down to 3 turns.

Figure 8:
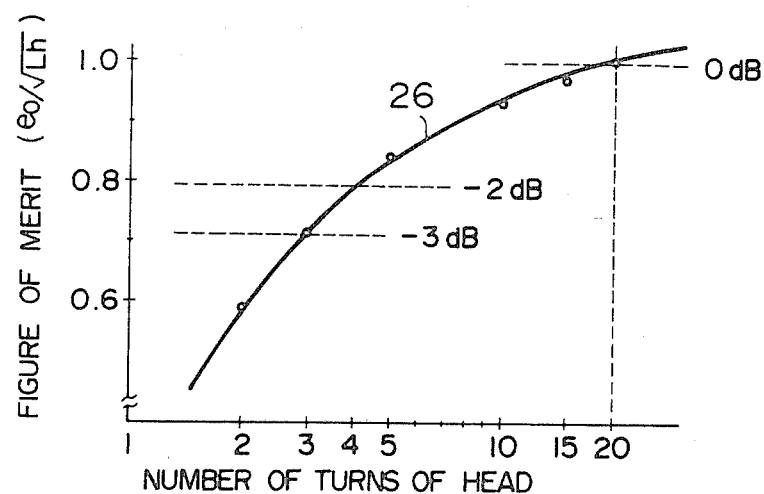
FIG. 8 is a graphical representation showing the relationship between the number of turns of the head and the figure of merit of the head.

The reason why the value of $e_o/\sqrt{Lh}$ falls as the number of turns of the head winding decreases as shown in FIG. 8 is mostly that the inductance of the head is not proportional to the square of the number of turns as shown by the solid line 24 in FIG. 7. The dashed line 25 in FIG. 7 shows the result of calculation on the assumption that the inductance is proportional to the square of the number of turns, whereas the solid line in FIG. 7 shows the result of the actual measurement. Inconsistency of the calculated values and measured values results from the stray inductance caused by the lead wires which connect the rotary transformer to the head. Thus the deterioration of the $e_o/\sqrt{Lh}$ following the reduced turns of the head winding is an intrinsic matter, and therefore, it is important to carry out, in combination, the reduction of amplifier noises by the feedback damping as described above.

Figure 5:
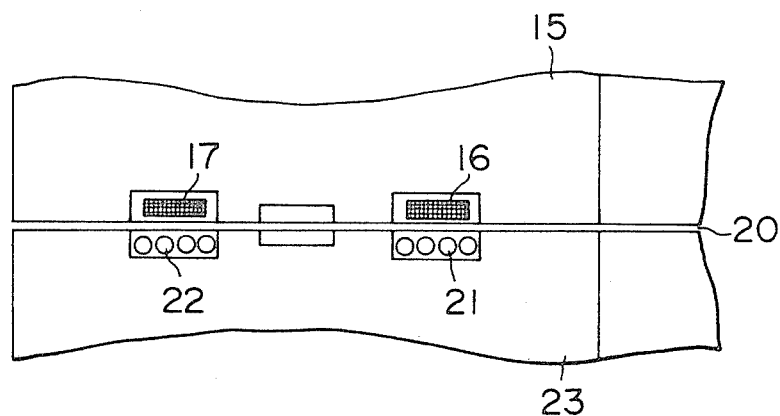
Figure 6:
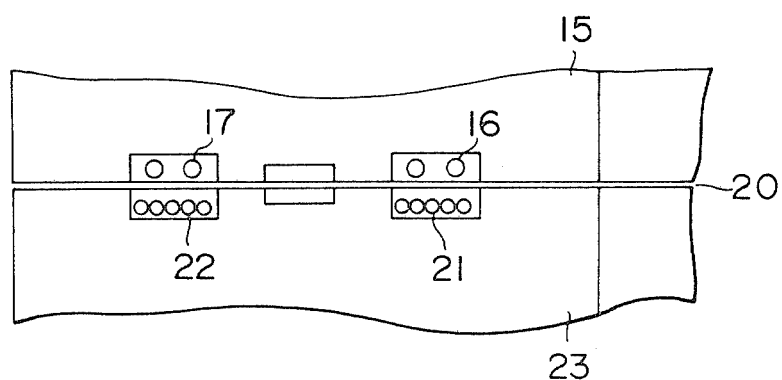
FIG. 6 is a cross-sectional view showing, as an example, the principal portions of the rotary transformer having a 2-turn primary winding used in the present invention.

The following will describe how to solve the problems which arise in the 1-turn winding of the rotary transformer. If the conventional 2-turn rotary transformer is simply modified to a 1-turn transformer, the coupling coefficient K will deteriorates from 0.97 to 0.95 and the inductance $L_{RF}$ from 10 $\mu$H to 2 $\mu$H. In addition, it will be very poor efficient work to make a 1-turn coil using a thin wire as used in the conventional apparatus and to fit the coil into the rotary transformer. This is because a 1-turn coil which has been shaped to the groove of the rotary transformer can easily be deformed during the assembly. In order to prevent such failure, the present invention proposes an improved 1-turn coil for the rotary transformer as shown by 16 and 17 in FIG. 5. Reference number 17 in FIG. 5 denotes a 1-turn coil which is characterized in the shape similar to a flat-type wire having a large cross-sectional area rather than a thin wire. The 1-turn coil can easily be manufactured by, for example, pressing a thick round wire on a flat-type stamp. By employment of the flat-type 1-turn coil, the coupling coefficient K can be improved from 0.95 to 0.97 and the inductance $L_{RF}$ from 2.0 $\mu$H to 2.5 $\mu$H, and also deformation of coils during the assembly can be prevented.

Next, the rotary transformer having a 2-turn primary winding will be described. In this case, for reducing the turns of the head, the value of $\gamma$ should be set as large as possible. Since the maximum allowable value of $\gamma$ is around 1.5, if K is set to 0.97, Lh becomes 1.6 $\mu$H and $n_H$ becomes 18 turns, with the values of n1 and n2 being 2 and 5, respectively. In this case, the inductance of the rotary transformer seen from the pre-amplifier will be: $1.6 \times (5/2)^2 + \beta = 11.5$ $\mu$H, and the resonant frequency of 5 MHz can be achieved by the resonant capacitance of 87 pF. This condition can be realized by the circuit arrangements shown in FIGS. 9 and 10.

If the coupling coefficient K of the rotary transformer is improved to 0.98 and $\gamma$ is set to approximately 1.5, Lh becomes approximately 1.3 $\mu$H and $n_H$ can be made 16 turns. In this case, if n1 and n2 are chosen to be 2 and 5, and 2 and 6, respectively, the inductance of the rotary transformer seen from the pre-amplifier will be: $1.3 \times (5/2)^2 + \beta = 9.6$ $\mu$H and $1.3 \times (6/2)^2 + \beta = 13.7$, respectively, and the resonant frequency of 5 MHz can be achieved by the resonant capacitance of 105 pF and 73 pF, respectively.

For the rotary transformer having a 2-turn primary winding, the head winding has 16–18 turns, and this is a small reduction from 20 turns. Nevertheless, the reduction from 20 turns to 16–18 turns results in a significant improvement for the productivity of the head winding. Deterioration of the figure of merit shown in FIG. 8 does not occur in this case, and both the performance and productivity can be improved simultaneously by the effect of the feedback damping.

The second embodiment of the invention, where the rotary transformer 50 shown in FIG. 3 has a diameter of around 30 mm and the winding has the minimum diameter of around 15 mm, will now be described. In this case, the value of $L_{RF}$ expressed in equation (2) becomes approximately 12 $\mu$H for a 4-turn winding and K becomes approximately 0.97. If the rotary transformer has a primary winding of 4 turns and $\gamma$ is set to 1, Lh becomes 2.9 $\mu$H, and if $\gamma$ is set to 1.5, Lh becomes 1.9 $\mu$H, causing the head winding to have 20–25 turns. In the conventional apparatus, the head winding of 20 turns has been chosen. In the conventional apparatus, $n_H = 20$ turns, Lh = 20 $\mu$H, n1 = 4, and n2 = 8. Accordingly, the inductance of the rotatry transformer seen from the pre-amplifier will be: $20 \times (8/4)^2 + \beta = 9.5$ $\mu$H (where $\beta$ is approximately 1.5), and the resonant frequency of 5 MHz is achieved by the resonant capacitance of 106 pF.

The first embodiment of the present invention, where the rotary transformer has a 3-turn primary winding and a 8-turn secondary winding, will be described. If $\beta$ is chosen to be approximately 1, LH becomes 1.6 $\mu$H and $n_H$ becomes 18 turns, and the inductance of the rotary transformer seen from the pre-amplifier will be: $1.6 \times (8/3)^2 = 11.4$ $\mu$H, then the resonant capacitance for obtaining the 5 MHz should be 88 pF. If $\gamma$ is chosen to be 1.5, Lh becomes 1.1 $\mu$H and $n_H$ becomes 15 turns, and the inductance of the rotary transformer seen from the pre-amplifier will be: $1.1$ $\mu$H $\times (8/3)^2 + \beta = 9.3$ $\mu$H (where $\beta$ is 1.5 $\mu$H), then the resonant capacitance for obtaining the 5 MHz should be 108 pF.

Next, another case where the rotary transformer has a 2-turn primary winding and a 8-turn secondary winding will be described. In this case, Lh becomes 3 $\mu$H and if $\gamma$ is chosen to be approximately 1, Lh becomes 0.8 and $n_H$ becomes 12 turns, and the inductance of the rotary transformer seen from the pre-amplifier will be: $0.8 \times (8/2)^2 = 12.8$ $\mu$H, then the resonant capacitance for obtaining the 5 MHz should be 78 pF. If $\gamma$ is chosen to be approximately 1.5, Lh becomes 0.48 $\mu$H and $n_H$ becomes 9 turns, and the inductance of the rotary transformer seen from the pre-amplifier will be: $0.48 \times (8/2)^2 + \beta = 9.2$ $\mu$H, then the resonant capacitance for obtaining the 5 MHz should be 110 pF.

Next, another case where the rotary transformer has a 1-turn primary winding and a 8-turn secondary winding will be described. In this case $L_{RF}$ becomes 0.75 $\mu$H, and if $\gamma$ is chosen to be approximately 1, Lh becomes 0.175 $\mu$H and $n_H$ becomes 5 turns, and the inductance of the rotary transformer seen from the pre-amplifier will be: $0.175 \times 8^2 = 11.2$ $\mu$H, then the resonant capacitance for obtaining the 5 MHz should be 90 pF. If $\gamma$ is chosen to be approximately 1.5, Lh becomes 0.12 $\mu$H and $n_H$ becomes 4 turns, and the inductance of the rotary transformer seen from the pre-amplifier will be: $0.12 \times 8^2 + \beta = 9.2$ $\mu$H, then the resonant capacitance for obtaining the 5 MHz should be 110 pF.

Next, another case where the rotary transformer has a 3-turn primary winding and a 9-turn secondary winding will be described. If $\gamma$ is chosen to be approximately 1, Lh becomes 1.6 $\mu$H and $n_H$ becomes 18 turns, and the inductance of the rotary transformer seen from the pre-amplifier (will be termed resonant inductance hereafter) will be: $1.6 \times (9/3)^2 = 14.4$ $\mu$H, then the resonant capacitance for obtaining the 5 MHz should be 70 pF. If $\gamma$ is choseen to be approximately 1.5, Lh becomes 1.1 $\mu$H and $n_H$ becomes 15 turns, and the inductance of the rotary transformer seen from the pre-amplifier will be: $1.1 \times (9/3)^2 + \beta = 11.4$ $\mu$H, then the resonant capacitance for obtaining the 5 MHz should be 88 pF.

Next, another case where the rotary transformer has a 3-turn primary winding and 10-turn secondary winding will be described. If $\gamma$ is chosen to be approximately 1, Lh becomes 1.6 $\mu$H and $n_H$ becomes 18 turns, and the resonant inductance will be: $1.6 \times (10/3)^2 = 17.8$ $\mu$H, then the resonant capacitance for obtaining the 5 MHz should be 56 pF. If $\gamma$ is chosen to be approximately 1.5, Lh becomes 1.1 $\mu$H and $n_H$ becomes 15 turns, and the resonant inductance will be: $1.1 \times (10/3)^2 + \beta = 13.7$ $\mu$H, then the resonant capacitance should be 73 pF.

The various cases of the rotary transformer as described above are summarized in Table 1.

TABLE 1

| Diameter | Rotary transformer Turn ratio | $n_1$ ($L_{RP}$) | $n_2$ | $n_H$ ($L_H$) | $\gamma$ | Resonant capacitance | $e_o/\sqrt{L_o}$ (dB) |
|---|---|---|---|---|---|---|---|
| 45 mm approx. | 2.5 | 2 (10 $\mu$H) | 5 | 16~18 $\mu$H (1.3~1.6) | 1.5 | 87~105 pF | −0.4 ~ −0.6 |
| | 3.0 | 2 (10) | 6 | 16 (1.3) | 1.5 | 73 | −0.6 |
| | 4.0 | 1 (2.5 $\mu$H) | 4 | 10~(0.58) | ~0.95 | ~108 | −0.5 |
| | 5.0 | 1 (2.5) | 5 | 8~10 (0.49~0.58) | 0.95~1.4 | 74~84 | −0.2 ~ −1.5 |
| | 6.0 | 1 (2.5) | 6 | 8~9 (0.40~0.49) | 1.2~1.4 | 52~60 | −1.0 ~ −1.4 |
| | 7.0 | 1 (2.5) | 7 | 8 (0.40) | 1.4 | 47 | −1.1 |
| 30 mm approx. | 2.7 | 3 (6.8) | 8 | 15~18 (1.1~1.6) | 1.0~1.5 | 88~108 | 0.2 ~ −0.5 |
| | 3.0 | 3 (6.8) | 9 | 15~18 (1.1~1.6) | 1.0~1.5 | 70~88 | 0.3 ~ −0.3 |
| | 3.3 | 3 (6.8) | 10 | 15~18 (1.1~1.6) | 1.0~1.5 | 56~73 | 0.2 ~ −0.2 |
| | 4.0 | 2 (3.0) | 8 | 9~12 (0.48~0.8) | 1.0~1.5 | 78~110 | −0.3 ~ −1.3 |
| | 4.5 | 2 (3.0) | 9 | 9~12 (0.48~0.8) | 1.0~1.5 | 62~90 | −0.3 ~ −1.1 |
| | 5.0 | 2 (3.0) | 10 | 9~10 (0.48~0.58) | 1.2~1.5 | 65~74 | −0.7 ~ −1.1 |
| | 6.0 | 1 (0.75) | 6 | 4~6 (0.12~0.24) | 0.8~1.5 | 116~173 | −1.1 ~ −2.8 |
| | 7.0 | 1 (0.75) | 7 | 4~6 (0.12~0.24) | 0.8~1.5 | 85~136 | −1.1 ~ −2.6 |
| | 8.0 | 1 (0.75) | 8 | 4~6 (0.12~0.24) | 0.8~1.5 | 65~109 | −1.1 ~ −2.4 |
| | 9.0 | 1 (0.75) | 9 | 4~5 (0.12~0.18) | 1.0~1.5 | 71~90 | −1.3 ~ −2.2 |

TABLE 1-continued

| Diameter | Rotary transformer Turn ratio $n_1$ ($L_{RP}$) | $n_2$ | $n_H$ ($L_H$) | $\gamma$ | Resonant capacitance | $e_o/\sqrt{L_o}$ (dB) |
|---|---|---|---|---|---|---|
| 10.0 | 1 (0.75) | 10 | 4 (0.12) | 1.5 | 74 | −2.1 |

Supposing that $e_o/\sqrt{L_o}=0$ dB when $n_1=2$, $n_2=4$, $n_H=20$ and $\gamma=1.0$, $e_o/\sqrt{L_o}$ can be represented as follows.

$$e_o/\sqrt{L_o} \approx \left(\frac{(\text{turn ratio}) \times n_H}{2 \times 20}\right) \bigg/ \sqrt{\frac{120 \text{ pF}}{(\text{resonant capacitance})}} = \frac{(\text{turn ratio}) \times n_H \times \sqrt{(\text{resonant capacitance})}}{40 \times \sqrt{120 \text{ pF}}}$$

From this equation, values of $e_o/\sqrt{L_o}$ shown in the Table 1 are obtained. It will be understood following matter from the Table 1. Namely, it is preferable to set $n_H$ to be smaller, the resonant capacitance larger and the deterioration of $e_o/\sqrt{L_o}$ smaller.

It is possible to prevent the deterioration of $e_o/\sqrt{L_o}$ even if $n_H$ is small as long as the input capacitance of the amplifier can be made smaller. If the amplifier noise can be made smaller, if $n_H$ can be made smaller since the deterioration of $e_o/\sqrt{L_o}$ can be allowed by the amount corresponding to the amount of decrease of th amplifier noise.

As described above, in the embodiment shown in FIGS. 9 and 10, the number of turns of the head is reduced by use of a rotary transformer having a turn ratio larger than 1:2. Fall in the resonant frequency and deterioration of noise matching which are caused by the larger turn ratio of the rotary transformer are compensated using the negative feedback damping instead of using the conventional trimmer capacitors for adjusting the resonant frequency and variable resistors for adjusting the boosting rate.

Figure 11:
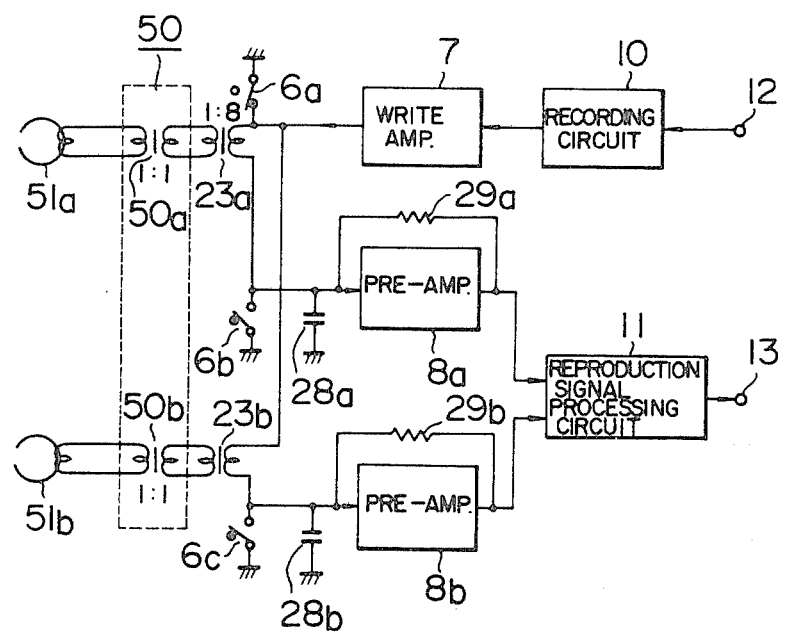
FIG. 11 is a block diagram showing still another example of the principal portions of the recording and reproducing system in the 2-head helical scanning VTR according to the present invention.

FIG. 11 shows another embodiment of the present invention. In this embodiment, each rotary transformer has a 1-turn rotor winding and a 1-turn stator winding, and there are provided step-up transformers 23a and 23b so that the rotary transformers make matching to the amplifiers 7, 8a and 8b. The rotary transformers 50 have characteristics that the coupling coefficient K equals 0.97 and inductance $L_R$ equals 0.5-0.7 μH (according to the usual design), then the inductance of the video head expressed in equation (2) is preferably ¼-1/6 of the $L_R$ with the number of turns being 5 turns. Since the rotary transformer 50 have a turn ratio of 1:1, the above-mentioned impedance is too low. Therefore, the step-up transformers 23a and 23b having a turn ratio of 8 are provided so as to improve the impedance as high as the conventional one. Consequently, the amplifiers 7, 8a and 8b shown in FIG. 11 can be the same ones shown in FIG. 2. That is to say, the turn ratio of the impedance transformer consisting of a rotary transformer and a step-up transformer is set to 1:8.

Since all windings of the rotary transformers 50a and 50b shown in FIG. 11 have one turn, their coupling coefficient can be improved significantly by appropriate design of the structure.

Figure 12:
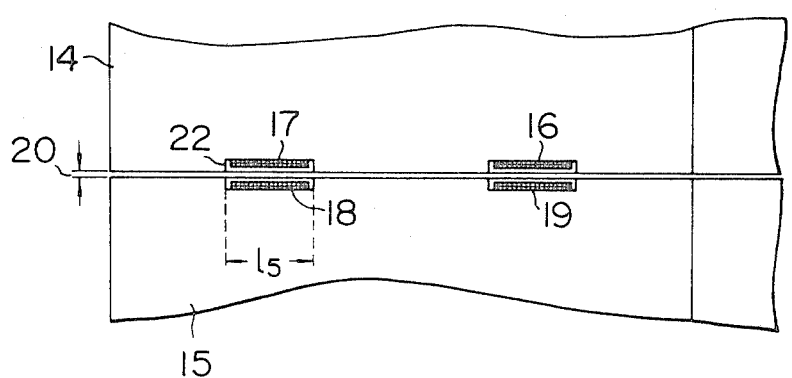
FIG. 12 is a cross-sectional view showing, as an example, the principal portions of the rotary transformer having a 1-turn primary winding used in the present invention.

FIG. 12 is a magnified view of the portion enclosed by the dashed line in FIG. 3B, explaining the structure of the rotary transformer with the improved coupling coefficient. The characteristics of the structure shown in FIG. 12 reside in the grooves 22 for the windings having a depth of around 300 μm which is less than half as compared with the conventional one, and also in the windings 16, 17, 18 and 19 using a flat-type wire. Owing to the structure shown in FIG. 12, the leakage flux can be reduced to ⅓ or less of the conventional one without changing the inductance $L_P$. With the air gap being 70 μm, the structure of FIG. 12 provides the coupling coefficient K of around 0.99 and $L_P$ of 0.5 μH, then the appropriate inductance of the head becomes 1/10-1/15 of $L_P$. Under these conditions, the number of turns of the head can be reduced down to 2-3 turns.

There can be considered several methods for manufacturing the winding shown in FIG. 12: a method where melted conductor is poured into the groove and the surface of the conductor is polished together with the core; a method where conductor is deposited only inside the groove; and a method where a formed thin conductor winding is stuck inside the groove.

The inductance $L_P$ of the winding shown in FIG. 12 can be reduced either by increasing the dimension 15 or decreasing the diameter of the winding. The matching inductance of the video head can be lowered sufficiently by enhancing the coupling coefficient and reducing the diameter of the winding, thereby allowing practically the head winding down to 1-2 turns.

An additional characteristic of the arrangement of FIG. 11 is that the value of $\gamma$ expressed by equation (2) can be set relatively large and the turns of the head can possibly be reduced further. In the arrangement of FIG. 11, the stray capacitance at the amplifier input which determines the resonant frequency is made small, and $\gamma$ can be set larger in inverse proportion to the stray capacitance. The stray capacitance is mostly created by the connection (generally shielded wire is used) between the rotary transformers 50 and the head amplifiers 8a and 8b. In the arrangement of FIG. 11, the rotary transformers 50 and the respective step-up transformers 23a and 23b are connected with shielded wires. The rotary transformers 50 have a very low output impedance and, therefore, they are not affected by the capacitance of the shielded wires. This allows the heads to have the 1-turn windings and the step-up transformers 23a and 23b to have a turn ratio of 1:40 (these conditions provides the same impedance as in the conventional heads having windings of 20 turns).

In this embodiment, as described above, a significant reduction in the number of turns of the head is achieved by enhancing the coupling coefficient K for the rotary transformer having a turn ratio of 1:1. The step-up transformers are provided for making impedance matching to the amplifiers 7, 8a and 8b due to the turn ratio of 1:1 for the rotary transformers. In this embodiment, the turn ratio of the impedance transformer consisting of the rotary transformer and the step-up transformer is made larger than 2, so that the output impedance seen from the input is made larger, whereby it functions identically to the rotary transformers shown in FIGS. 9 and 10. In this embodiment, as described above, turns of the video head can be reduced from 15-20 turns that is common in the conventional apparatus to 1-5 turns, and this allows considerable enhancement in the productivity of the rotary head. Moreover, the coupling coefficient of rotary heads can also be improved, and this allows miniaturization and upgrading for the rotary transformer.

Finally, the major characteristics of the present invention are summarized as follows. (1) The turn ratio of the rotary transformer or the step-up ratio of the step-up transformer is made larger than 2. More particularly, the ratio can be selected in the range from 2.5 to 10.0 as shown in Table 1. (2) The number of turns of the video head is reduced down to 4-18 turns as a result of determination in item (1) so as to improve the productivity of the video head. (3) Increased equipment noise and the increased resonant inductance, which are the side effect of item (2), are compensated by the feedback damping and by reducing the resonant capacitance by removal of the trimmer capacitors, fixed capacitors or shielded wires. (4) In case noise matching between the video head and the rotary transformer is needed, the number of turns of the head is chosen, provided that $\gamma$ is less than 1.5 and the desired resonant frequency is obtained.

According to the present invention, as described above, the number of turns of the video head can be reduced from 15-20 turns as seen in the conventional apparatus down to 3-16 turns, whereby the productivity of the video head is enhanced significantly.

It will be appreciated that the present invention can be applied also to reproducing apparatus for VTRs which serve entirely for reproducing pictures.

We claim:

1. A picture reproducing apparatus in a helical scanning video tape recorder comprising:
    an impedance transformer including a rotary transformer having a rotor core and a stator core having opposed main surfaces which are substantially flat, a rotor winding and a stator winding of said rotary transformer being fitted into a rotor winding slot and a stator winding slot formed on said opposed main surfaces of said rotor and stator cores, respectively, in a manner that said rotor and stator windings are arranged concentrically with respect to the center of rotation said rotor core and opposed to each other, the number of turns of said rotor winding being one turn, and said rotor winding having a rectangular cross-sectional configuration with a length of said rotor winding in a radial direction along said main surface being larger than a length thereof in a direction perpendicular to said main surface;
    a video head connected to said rotor winding of said rotary transformer;
    a resonance circuit connected to said stator winding side of said rotary transformer;
    a pre-amplifier having an input connected to the output of said resonance circuit and an input for supplying a signal to further circuitry; and
    means forming a negative resistive feedback path connected between said input of said pre-amplifier and the output of said pre-amplifier.

2. A picture reproducing apparatus according to claim 1, wherein the number of turns of said stator winding is more than three, the cross-section of a turn of said stator winding having a substantially circular configuration, and the cross-sectional area of said rotor winding being larger the cross-sectional area of one turn of said stator winding.

3. A picture reproducing apparatus according to claim 2, wherein a length of said rotor winding slot in the radial direction and a length of said rotor winding slot in a direction perpendicular to the radial direction are substantially the same as a length of said stator winding slot in the radial direction and a length of said stator winding slot in a direction perpendicular to the radial direction, respectively.

4. A picture reproducing apparatus according to claim 1, wherein said rotor winding slot has a substantially rectangular cross-sectional configuration, and said rotor winding is formed by pressing a round conductive wire into a stamp means having substantially the same configuration as said rotor winding slot.

5. A picture reproducing apparatus according to claim 1, wherein the number of turns of sid stator winding is one and said stator winding has substantially the same configuration as said rotor winding.

6. A picture reproducing apparatus according to claim 1 or 5, wherein said impedance transformer further includes a step-up transformer having a primary winding connected to said stator winding of said rotary transformer and a secondary winding connected to said resonance circuit.

* * * * *